(12) United States Patent
Fujio (10) Patent No.: US 6,189,081 B1
(45) Date of Patent: *Feb. 13, 2001

(54) NON-VOLATILE SEMICONDUCTOR STORAGE WITH MEMORY REQUIREMENT AND AVAILABILITY COMPARISON MEANS AND METHOD (75) Inventor: Ryosuke Fujio, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/862,373

(22) Filed: May 23, 1997

(30) Foreign Application Priority Data

May 24, 1996 (JP) .................................................. 8-153048

(51) Int. Cl.[7] ...................................................... G06F 12/02
(52) U.S. Cl. .......................... 711/171; 711/172; 711/170; 709/104
(58) Field of Search .................................... 395/825, 856; 711/5, 171, 100, 101, 111, 159, 170, 172, 173; 709/104, 105

(56) References Cited

U.S. PATENT DOCUMENTS

| 5,339,411 | * | 8/1994 | Heaton, Jr. ............................ 711/171 |
| 5,535,369 | * | 7/1996 | Wells et al. ........................... 711/171 |
| 5,568,635 | * | 10/1996 | Yamaguchi ........................... 711/171 |
| 5,579,507 | * | 11/1996 | Hosouchi et al. .................... 711/171 |
| 5,584,042 | * | 12/1996 | Cormier et al. ....................... 710/36 |
| 5,619,669 | * | 4/1997 | Katsuda .................................. 711/5 |
| 5,790,886 | * | 8/1998 | Allen ...................................... 710/5 |

FOREIGN PATENT DOCUMENTS

| 1-298600 | 12/1989 | (JP) . |
| 2-71335 | 3/1990 | (JP) . |
| 4-84216 | 3/1992 | (JP) . |
| 6-139140 | 5/1994 | (JP) . |
| 7-191892 | 7/1995 | (JP) . |
| 7-219720 | 8/1995 | (JP) . |
| 7-244992 | 9/1995 | (JP) . |
| 8-115238 | 5/1996 | (JP) . |

* cited by examiner

Primary Examiner—B. James Peikari
(74) Attorney, Agent, or Firm—Young & Thompson (57) ABSTRACT

In a non-volatile semiconductor storage, at the time of a data writing, the size of the data to be written is compared with the size of an erase block and/or the size of a writable storage unit in the erase block. The data having the size corresponding to the size of the erase block is written into a writable erase block, and the data having the size smaller than the size of the erase block is written into the writable storage unit(s), so that a storing area optimum to the size of the data to be written is allocated.

6 Claims, 11 Drawing Sheets

NON-VOLATILE SEMICONDUCTOR STORAGE WITH MEMORY REQUIREMENT AND AVAILABILITY COMPARISON MEANS AND METHOD

BACKGROUND OF THE INVENTION

1. Field of the Invention

The present invention relates to a non-volatile semiconductor storage, and more specifically to an improved method for writing and rewriting data in a non-volatile semiconductor storage.

2. Description of Related Art

In the prior art, a disk apparatus used as an external storage for a personal computer mainly includes a hard disk apparatus, a floppy disk apparatus and an optical magnetic disk apparatus. Recently, an external storage composed of a semiconductor memory has been developed. This semiconductor storage is still high in cost per a memory capacity, in comparison with the above mentioned disk apparatuses, but have various advantages that: mechanical parts are a little; it is easy to miniaturize and lighten; a moisture resistance is high; impact resistance is also high; an operation speed is high; and electric power consumption is lower. Therefore, the semiconductor storage is expected to be applied to portable or handy instruments in the form of a memory card including a plurality of semiconductor memories accommodated in a card-shaped housing.

The semiconductor memories constituting the semiconductor storage can roughly be divided into a RAM (random access memory) and ROM (read only memory). The RAM is volatile, and needs a backup power battery in order to continue to maintain stored data. Therefore, consumed electric power increases. On the other hand, the ROM is non-volatile and needs no backup power battery in order to continue to maintain stored data. Therefore, it is optimum to realize a lower electric power consumption. The ROM includes an MROM (Mask ROM), a UVEPROM (Ultra-Violet Erasable and Programmable ROM), and an EEPROM (Electrically Erasable and Programmable ROM).

Of these various types of ROM, the MROM is inexpensive, but is limited in a use extent since it is impossible to rewrite data. The UVEPROM is possible to rewrite data, but is also limited in a use extent, although it has the use extent wider than that of the MROM, since it is necessary to irradiate ultraviolet for erasure of old data prior to a data rewriting. The EEPROM is possible to rewrite data with no necessity of ultraviolet irradiation, and therefore, can be said to be optimum to a semiconductor storage disk.

The EEPROM includes a byte erasure type EEPROM configured to erase data in units of bytes, and a flash type EEPROM capable of erasing all data in the memory chip in bundle or in units of block which are larger than the bytes. This flash type EEPROM will be called simply a "flash memory" hereinafter.

The byte erasure type EEPROM needs an erasure circuit for erasing data in units of bytes, which is more complicated than that of the flash memory, and which requires circuits elements of the number larger than that required in the flash memory. In comparison with the flash memory, therefore, the byte erasure type EEPROM is not suitable in order to realize a large memory capacity of semiconductor storage disk. On the other hand, the flask memory of the type configured to erase all data in the memory chip in bundles has such a disadvantage that, a buffer memory has the same memory capacity as that of the flash memory, in order to save the data not to be rewritten when only a portion of the data is to be rewritten, and therefore, a rewriting time inevitably becomes long. Recently, under these circumstance, it is in many cases that the flash memory of the type configured to erase data in the memory chip in units of blocks, is incorporated into the semiconductor memory disk.

Now, a non-volatile semiconductor storage using the flash memory (called a "semiconductor disk" hereinafter) will be described.

Figure 1:
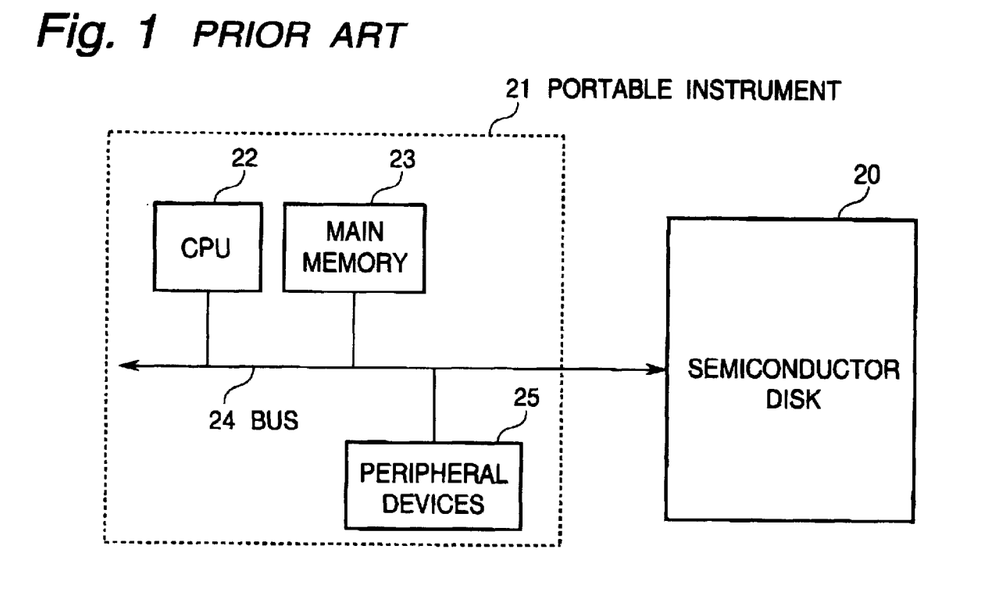
FIG. 1 is a block diagram illustrating an overall structure of the portable or handy instrument and the semiconductor disk using the flash memory.

Referring to FIG. 1, there is shown a block diagram illustrating an overall structure of a portable or handy instrument and the semiconductor disk using the flash memory. A semiconductor disk 20 is connected to a portable instrument 21 through an electrical connection means (not shown) such as an electrical connector. The portable instrument 21 includes a central processing unit (CPU) 22, a main memory 23 and peripheral devices 25, which are coupled in common to a bus 24. The bus 24 is connected to the electrical connection means to the semiconductor disk 20.

Figure 2:
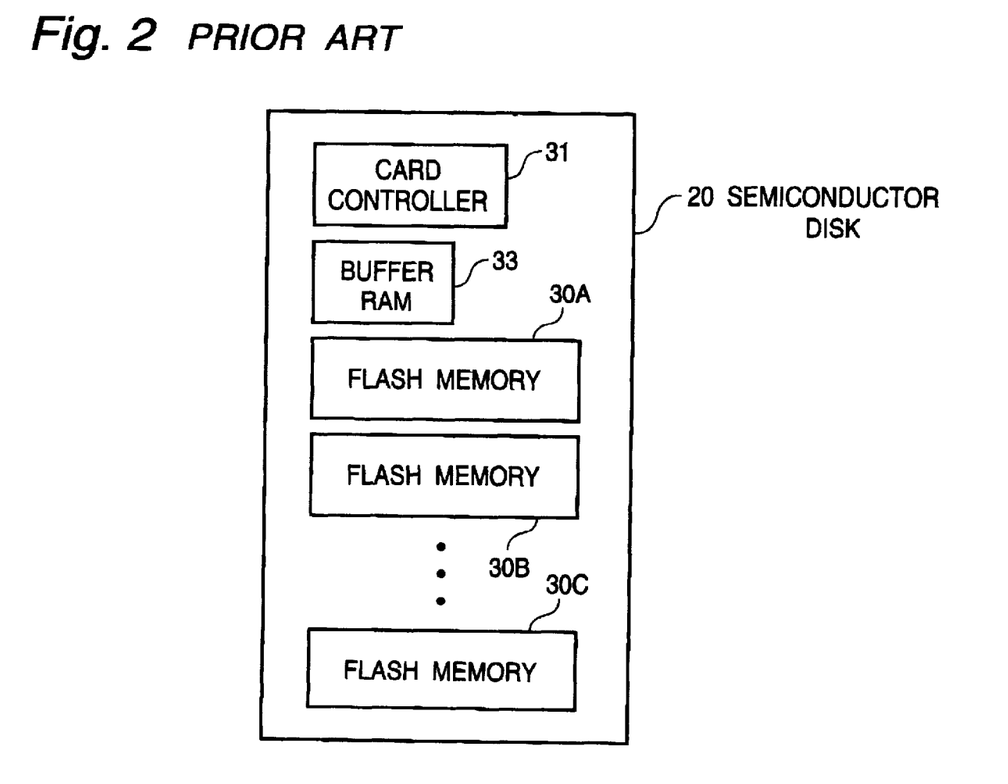
FIG. 2 is a block diagram illustrating an internal structure of the semiconductor disk shown in FIG. 1.

As shown in FIG. 2, the semiconductor disk 20 includes one or more flash memories 30A to 30C (which are representatively designated by Reference Numeral "30" in this specification), a card controller 31 for controlling all data processings between the portable instrument 21 and the semiconductor disk 20, which are exemplified by a reading of data from the semiconductor disk 20, a writing of data into the semiconductor disk 20 and a rewriting of data in the semiconductor disk 20, and a buffer RAM 33 for temporarily storing the data processed between the portable instrument 21 and the semiconductor disk 20.

Figure 3:
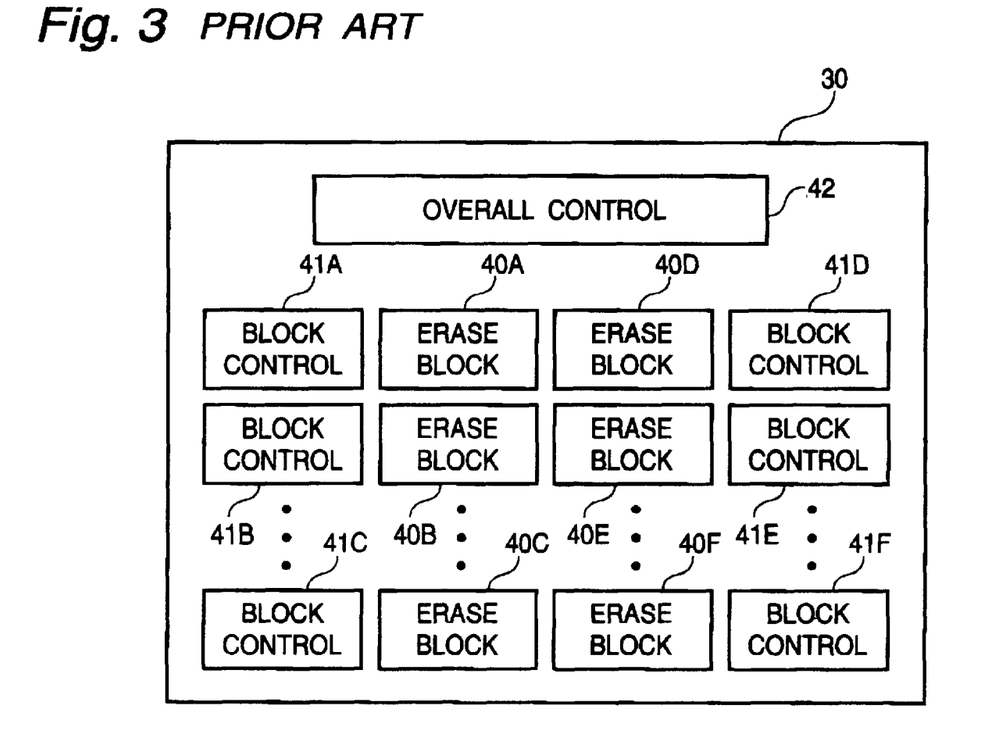
FIG. 3 is a block diagram illustrating an internal structure of each flash memory included in the semiconductor disk shown in FIG. 2.

In each flash memory 30 mounted on the semiconductor disk 20, as shown in FIG. 3, a chip is divided into one or more blocks 40A to 40F (which are representatively designated by Reference Numeral "40" in this specification). These blocks 40 are so configured that data stored in the flash memory can be erased in units of block, under control of an overall control circuit 42 (for controlling the whole of the flash memory 30) and block control circuits 41A to 41F (which are representatively designated by Reference Numeral "41" in this specification) which are provided for the blocks 40A to 40F, respectively, in a one-to-one relation. Since the overall control circuit 42 and the block control circuits 41 are well known to persons skilled in the art, explanation of a detailed control performed by these control circuits will be omitted.

In a 16 Mbit flash memory, for example, one is so configured that each one erase block is constituted of 64 Kbytes, and another is so configured that each one erase block is constituted of 8 Kbytes.

Ordinarily, the portable instrument 21 and the semiconductor disk 20 are interconnected through a special interface (for example, a disk interface), so that it is an ordinary practice that a data transfer between the portable instrument 21 and the semiconductor disk 20 is performed in units of sector, which is composed of 512 bytes.

Next, a data management in disk apparatuses will be described. An on-disk data structure in a hard disk or a floppy disk is different depending upon an operating system (OS) for supporting the disk apparatus, if it is compared in detail, but a fundamental data structure can be said to be the same. Here, the MS-DOS (Microsoft Disk Operating System) will be described as one example.

Figure 4:
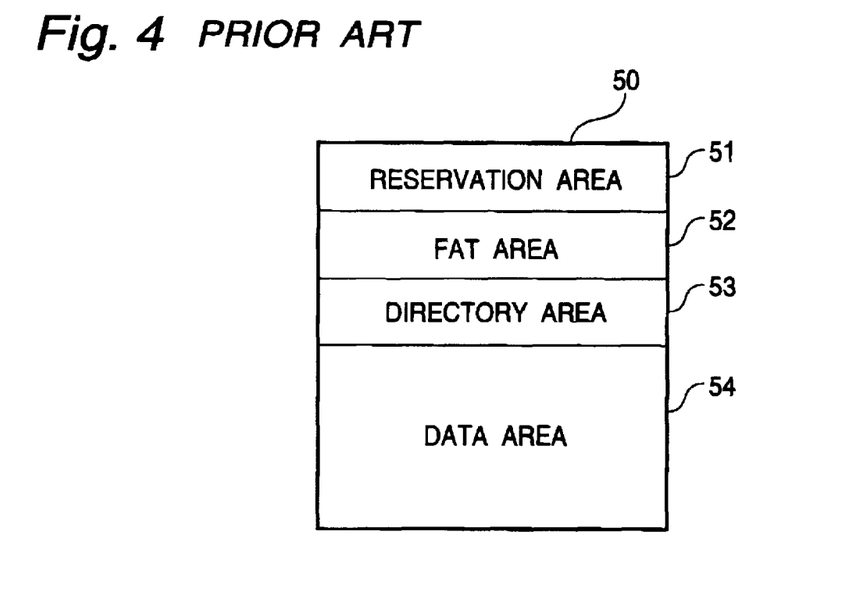
FIG. 4 illustrates a structure of the storage area on the disk.

In the MS-DOS, as shown in FIG. 4, a storage area 50 on the disk is divided into four areas, namely, a reservation area 51, a FAT (File Allocation Table) area 52, a directory area 53 and a data area 54. Incidentally, a minimum storage unit in the disk is a sector.

When a user uses the disk apparatus, it is unnecessary for the user to know where a file concerned is on the disk. This is all managed by the disk operating system. If a designated file name is given, the disk operating system can know a position within the data area 54 where the file concerned is stored, on the basis of the data in the directory area 53 and the FAT area 52 on the disk.

Figure 5:
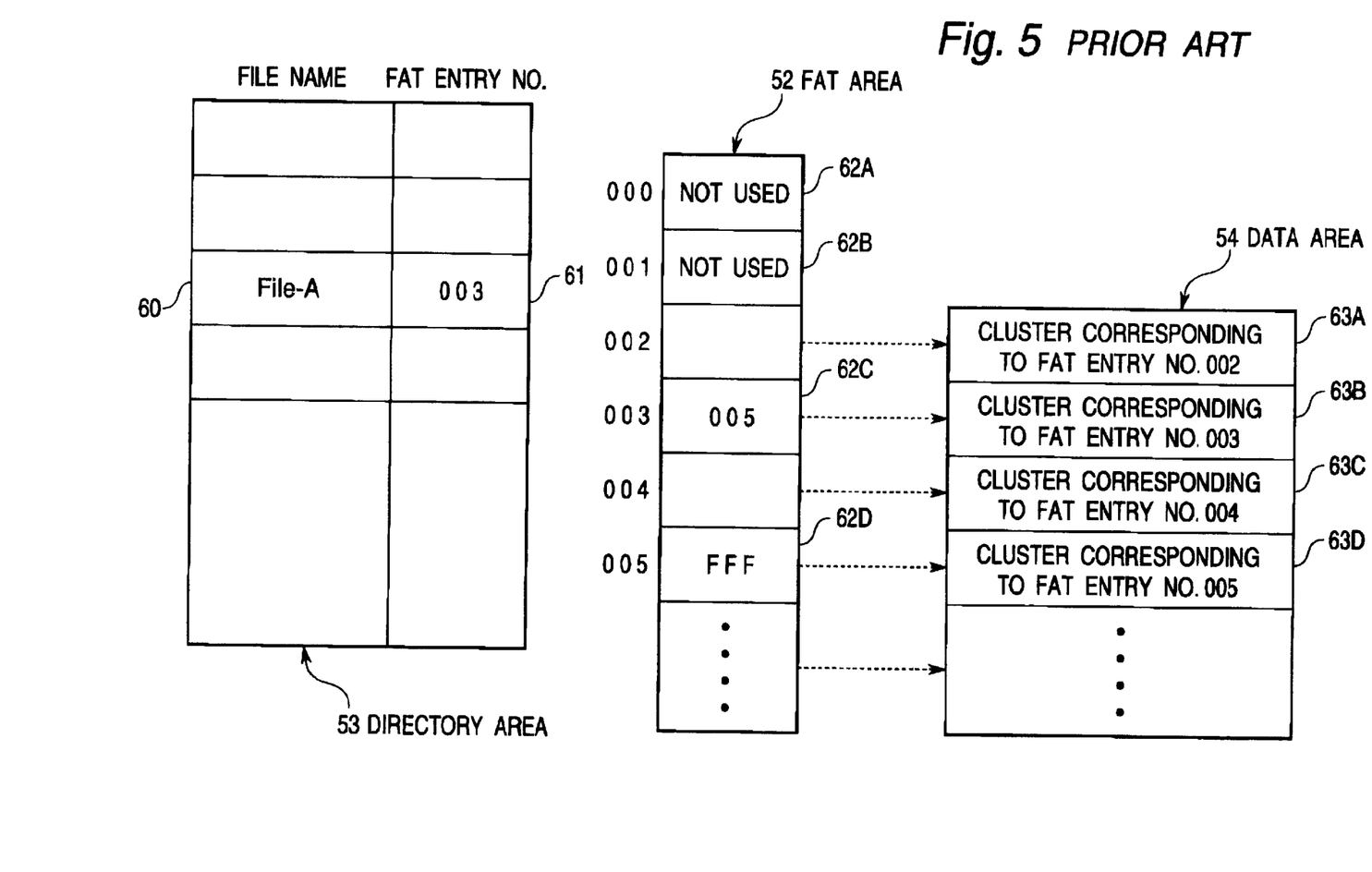
FIG. 5 illustrates a file management on the disk.

This method is illustrated in FIG. 5. The directory area 53 stores file names 60 each corresponding to one file and FAT entry numbers 61 each indicating where the corresponding file exists on the disk. Actually, the directory area 53 stores other data including file attribute information, but since information other than the above two kinds of information has no close relation of the subject matter of the present invention, explanation thereof will be omitted.

When the disk operating system prepares the file, the disk operating system allocates the file into the data area 54, not in units of sector, but in units of cluster which has the same size as that of the sector or a size corresponding to a plurality of sectors. Thus, the disk operating system manages the data area 54 by dividing the data area into a plurality of clusters 63A to 63D (which are representatively designated by Reference Numeral "63" in this specification).

If the file is small in size, the file can be stored in only one cluster, but if the file is large in size, a plurality of clusters are required to store the large file. In this time, the clusters storing the large file is not necessarily continuous, and continuity of the clusters storing the large file is indicated by the FAT entry number 61. The FAT area 52 is a set of units which are called "entries 62A to 62D" (which are representatively designated by Reference Numeral "62" in this specification), and each entry 62 corresponds to one cluster in the data area 54, in a one-to-one relation.

Ordinarily, the entry numbers "000" and "001" in the FAT area 52 are not-used areas, and effective entries starts from the entry number "002". The entry number "002" in the FAT area 52 corresponds to a first cluster 63A in the data area 54, and the entry number "003" in the FAT area 52 corresponds to a second cluster 63B in the data area 54.

Each entry 62 in the FAT area 52 indicates a use/empty state of the corresponding cluster and a link status of the file stored. The entry value "000" means that the corresponding cluster is empty, and the entry value "FFF" (in hexadecimal notation) indicates the completion of the file. The entry values "002" to "FF7" means that more than one cluster is required to store the file, and indicates the number of a cluster storing a portion next to a portion stored in the corresponding cluster.

For example, when "FILE-A" is accessed in an example shown in FIG. 5, the "FILE-A" is first searched, and the FAT entry number 61 "003" corresponding to the "FILE-A" is recognized. This means that the "FILE-A" is stored in the cluster corresponding to the FAT entry No. 003.

Next, if the value in the entry No. 003 of the FAT area 52 is investigated, the "FAT entry No. 005" is found. This means that a next cluster storing the "FILE-A" is a cluster corresponding to the FAT entry No. 005.

Succeedingly, the value in the entry No. 005 of the FAT area 52 is investigated. In this case, the "FAT entry No. FFF" is found. As mentioned above, this means the completion of the file. Namely, the "FILE-A" starts from the cluster corresponding to the FAT entry No. 003, and is stored in two clusters corresponding to the "FAT entry Nos. 003 and 005.

Figure 6:
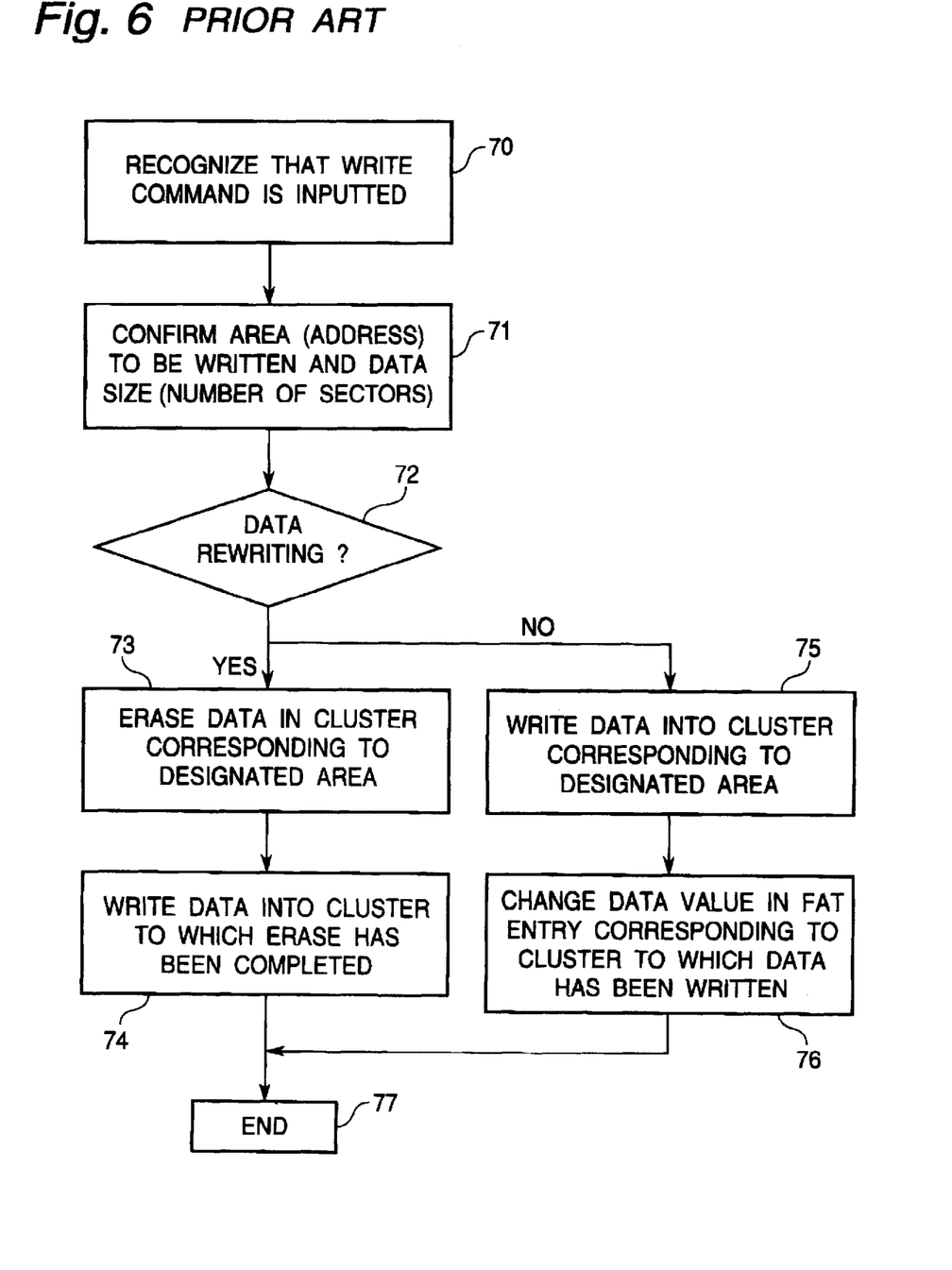
FIG. 6 is a flow chart illustrating a writing operation of the prior art semiconductor disk.

Now, an operation of the prior art semiconductor disk will be described with reference to a flow chart of FIG. 6.

As one example, assuming that the semiconductor disk 20 is composed of flash memories which are so configured that each erase block 40 has the size of 512 bytes (one sector) and a unit of one cluster 63 is set to be one sector, a data writing method will be described.

If a data writing command is issued to the semiconductor disk 20 from the portable instrument 21, the card controller 31 recognizes that the data writing command has been issued (Step 70), and confirms a size of data to be written (number of sections) and an area (or address) where the data is to be written (Step 71).

Next, the card controller 31 decides on the basis of the value in the FAT entry 62 of the FAT area 52 for the area where the data is to be written, whether the writing operation is a fresh writing (writing to an empty storage area) or a rewriting (writing to a storage areas to which data has been already written) (Step 72). If the writing operation is the rewriting operation, prior to a writing, the card controller 31 issues an erase instruction for a corresponding cluster 53, to the flash memory 30 (Step 73), and after the completion of the erasing, the card controller 31 executes the writing of the rewrite data (Step 74) and then, completes the operation (Step 77).

On the other hand, when the writing operation is the fresh writing operation, the card controller 31 executes the writing to a corresponding cluster 54 in the flash memory 30 (Step 75), and updates or changes the value in the FAT entry 62 of the FAT area 52 corresponding to the written cluster (Step 76). Then, the operation is completed (Step 77).

One method for realizing the above mentioned operation is disclosed by for example Japanese Patent Application Pre-examination Publication No. JP-A-4-084216 (an English abstract of which is available from the Japanese Patent Office and is incorporated by reference in its entirety into this application). In brief, JP-A-4-084216 proposes a semiconductor disk so configured that each erase block 40 of each flash memory 30 is made the same in size as a sector which is the unit of data reading/writing or a cluster which is the unit of a file allocation, so that the memory capacity of the buffer RAM 33 can be made small or the buffer RAM 33 can be made unnecessary, whereby a data rewriting speed is elevated, with the result that a high speed semiconductor disk is realized.

Furthermore, Japanese Patent Application Pre-examination Publication No. JP-A-1-298600 (an English abstract of which is available from the Japanese Patent Office and is incorporated by reference in its entirety into this application) proposes to an electrically programmable and executable non-volatile semiconductor memory which comprises a block selection circuit for outputting a block selection signal selecting an arbitrary number of blocks to be erased, from a plurality of independently writable and erasable blocks, a storage circuit storing the block selection signal for selecting the arbitrary number of blocks to be erased, and a block erasing circuit for supplying a block erasure signal to the selected blocks.

However, the above mentioned prior arts have the following problems.

A first problem is that it is difficult to realize a large capacity storage by use of the prior art non-volatile semiconductor memory using the flash memory.

The reason for this is that if the sector which is the unit of data reading is caused to correspond to one erase block of the flash memory, the number of erase blocks per a unitary storage capacity in the flash memory becomes remarkably large, with the result that the control circuit for individually controlling each erase block becomes complicated, and the number of circuit elements correspondingly becomes large.

A second problem is that the number of files which can be stored becomes small. The reason for this is that when one erase block of the flash memory is caused to correspond to one cluster which is the unit of a file allocation, not to the sector which is the unit of data reading, in order to overcome the above mentioned first problem, if the size of the cluster is too large, since one cluster is allocated to even a file having the size which does not reach the size of one cluster, the storage area is wasted.

The third problem is that the number of the rewritings of the erase blocks in the flash memory becomes any more than necessary, and therefore, there is possibility that the deterioration of the characteristics of the flash memory is facilitated.

The reason for this is that the flash memory has a lifetime in the number of rewritings. If the number of rewritings exceeds the lifetime, there is an inclination that the speed of the writing and erasing becomes remarkably slow, although a device destroy has not yet occurred. For example, the lifetime in the number of rewritings of the flash memory is said to be on the order of 1,000 to 1,000,000. When the flash memory is used as a storage means, if many erase blocks are required for storing data, the number of blocks required to be erased at the time of the data rewriting becomes large. In addition, if the rewritings are concentrated on a specific limited erase block, the number of the rewritings of the specific limited erase block reaches the lifetime in the number of rewritings earlier than the other erase blocks, with the result that the writing speed of the whole of the memory device becomes late.

SUMMARY OF THE INVENTION

Accordingly, it is an object of the present invention to provide a non-volatile semiconductor storage which has overcome the above mentioned defects of the conventional ones.

Another object of the present invention is to provide a non-volatile semiconductor storage having an elevated data processing efficiency by minimizing the number of erase blocks allocated at the time of a data writing.

Still another object of the present invention is to provide a non-volatile semiconductor storage having an elevated reliability, by minimizing the number of erasings of erase blocks conducted at the time of a data rewriting, in the non-volatile semiconductor storage having a lifetime in the number of rewritings.

The above and other objects of the present invention are achieved in accordance with the present invention by a non-volatile semiconductor storage comprising a means comparing, at the time of a data writing, the size of data to be written, with the size of an erase block and/or the size of a writable storage unit in the erase block, for writing the data having the size corresponding to the size of the erase block, into a writable erase block, and the data having the size smaller than the size of the erase block, into the writable storage unit(s), thereby to allocate a storing area optimum to the size of the data to be written.

Thus, when data is to be written into the non-volatile semiconductor storage, the block corresponding to the size of the data to be written is allocated, so that the number of erasings in the blocks occurring at the time of the data rewriting can be reduced.

The above and other objects, features and advantages of the present invention will be apparent from the following description of preferred embodiments of the invention with reference to the accompanying drawings.

DESCRIPTION OF THE PREFERRED EMBODIMENTS

Now, embodiments of the present invention will be described with reference to the accompanying drawings.

Figure 7:
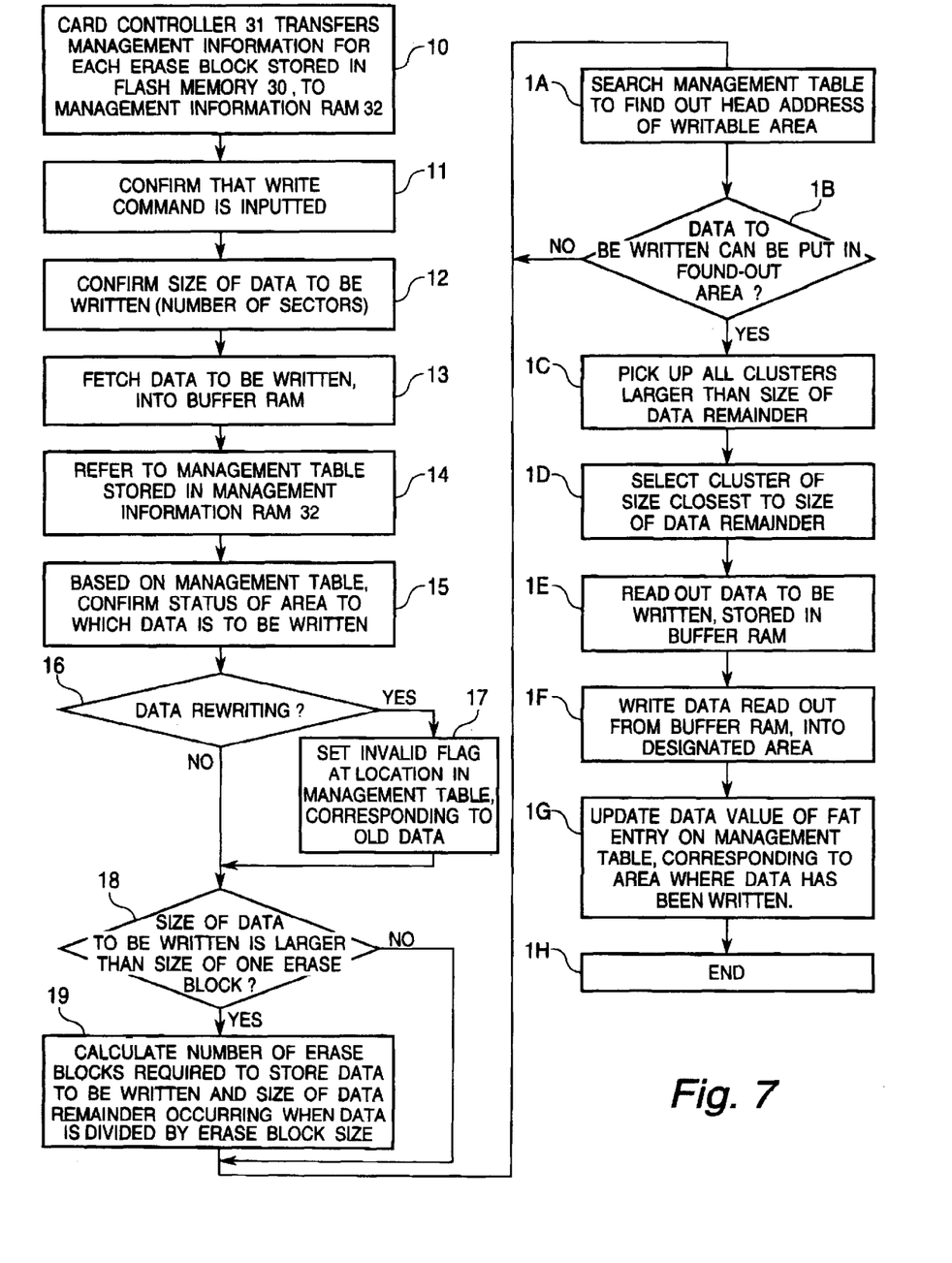
FIG. 7 is a flow chart illustrating a writing operation of the semiconductor disk in accordance with the present invention.
Figure 8:
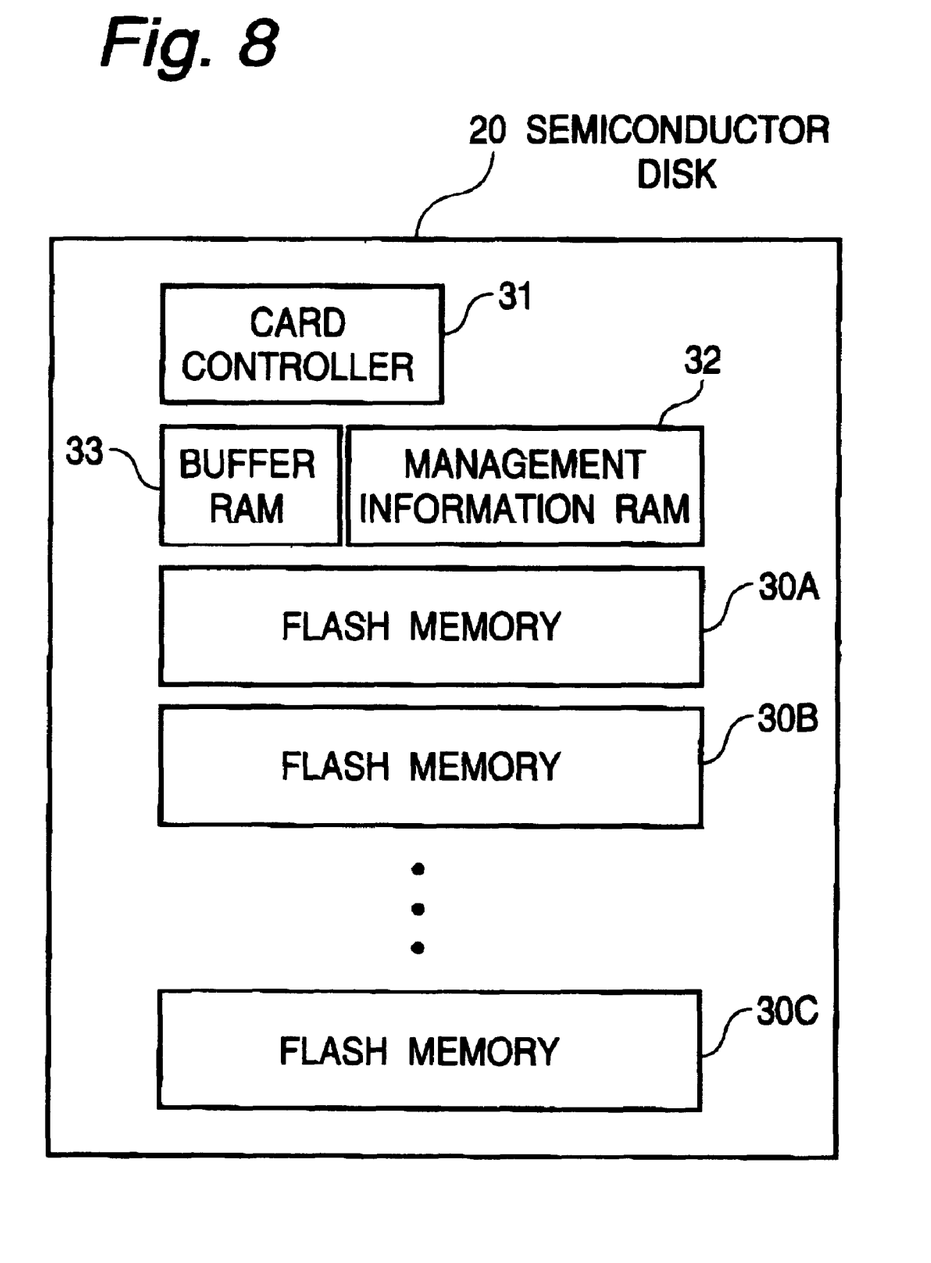
FIG. 8 is a block diagram illustrating an internal structure of the semiconductor disk in accordance with the present invention.

Referring to FIG. 7, there is shown a flow chart illustrating a writing operation of the semiconductor disk in accordance with the present invention. FIG. 8 is a block diagram illustrating an internal structure of the semiconductor disk in accordance with the present invention.

As shown in FIG. 8, an embodiment of the semiconductor disk in accordance with the present invention is generally designated by Reference Numeral 20, and includes a plurality of flash memories 30A, 30B, . . . , 30C (which are representatively designated by Reference Numeral "30" in this specification). Each of flash memories 30 is electrically programmable and erasable, and has an internal structure divided into a plurality of erase blocks as shown in FIG. 3 and is so configured that erasure is performed in units of an erase block.

The semiconductor disk 20 also includes a card controller 31 for controlling all data processings between the semiconductor disk 20 and an external such as the portable instrument 21 as shown in FIG. 1, and a management information RAM 32 configured to receive and store data storage management information of each block transferred from each flash memory 30, under control of the card controller 31 after the power is turned on. This data storage management information stored in the management information RAM 32 will be called a "management information table" hereinafter. When data from an external source to be written into the semiconductor disk 20, the management information table stored in the management information RAM 32 is referred to by the card controller 31, for the purpose of allocating data to be written. Furthermore, the semiconductor disk 20 includes a buffer RAM 33 for temporarily storing the data when the data is written into the semiconductor disk 20 from the external source and when the data is outputted from the semiconductor disk 20 to the external source. The semiconductor disk 20 includes a means (not shown) such as a connector, for electrically connecting with the external such as the portable instrument 21.

Now, an operation of the semiconductor disk 20 will be described with reference to FIGS. 7 and 8.

After the power for the semiconductor disk 20 is turned on, the card controller 31 instructs each flash memory 30 to transfer data storage management information for each erase block stored in each flash memory 30, to the management information RAM 32 (step 10). Here, the data storage management information can be stored individually and separately in each erase block, or the data storage management information for all the erase blocks included in one flash memory can be stored collectively in one erase block.

If a data write demand is issued to the semiconductor disk 20, the card controller 31 first confirms that the write command has been issued (Step 11), and then, confirms the size of the data to be written (number of sectors) and a designated area to which data is to be written. Furthermore, the card controller 31 fetches the data to be written, into the buffer RAM 33.

Next, the card controller 31 refers to the data storage management information for each erase block in each flash memory 30 (management information table), stored in the management information RAM 32 (Step 14), and confirms, on the basis of the management information table, the status of the designated area (cluster(s)) to which the data is to be written (Step 15), in order to confirm which of the fresh writing and the rewriting the data writing is appropriate (Step 16).

Here, if data has been already stored in the designated cluster(s) to which the data is to be written, namely, in the case of the data rewriting, the prior art procedure firstly erases a block containing the designated cluster(s) to which the data is to be written, and thereafter, writes the data into the designated cluster. However, this prior art procedure cannot realize a high speed operation.

In order to avoid this disadvantage, in the shown embodiment of the present invention, the card controller 31 refers to the management information table stored in the management information RAM 32, and rewrites the FAT entry corresponding to the designated cluster(s) to which the data is to be written, to a value indicating "invalidity" (Step 17). Namely, an invalid flag is set at a location in the management table, corresponding to the designated cluster(s).

On the other hand, when the data writing is the fresh writing, the above mentioned step for invalidating the corresponding FAT entry is not necessary.

Then, the card controller 31 compares the size of the data to be written, with the size of the erase block in the flash memory (Step 18).

In the above mentioned comparison step, if the size of the data to be written is larger than the size of the erase block in the flash memory, the card controller 31 calculates the natural number of erase blocks required to store the data to be written, and the size of a data remainder generating when the size of the data to be written is subtracted by the erase block size multiplied by the calculated natural number (Step 19). For example, if the size of the data to be written is equal to the erase block size multiplied by a natural number, the size of the data remainder is 0 (zero). If the size of the data to be written does not reach one erase block size, the natural number of erase blocks required is calculated as 0 (zero), and the size of the data to be written is calculated as the size of the data remainder.

Thereafter, the card controller 31 refers to the management information table in the management information RAM 32, to find out a writable erase block(s), and also to find out a head address of a writable cluster(s) when the size of the data to be written does not reach one erase block size or when a data remainder generates when the size of the data to be written is subtracted by the erase block size multiplied by a natural number (Step 1A).

Next, the card controller 31 determines whether or not the data remainder can be put in the found-out writable cluster included in the searched erase block. If the size of the writable cluster is smaller than the size of the data remainder, the card controller 31 further refers to the management information table in the management information RAM 32 again, to repeat the finding-out of a writable cluster (Step 1B), so as to ultimately find out a writable cluster(s) of the size not smaller than the size of the data remainder (Step 1C).

Succeedingly, the card controller 31 selects a writable cluster of the size closest (most preferably equal) to the size of the data remainder, from the writable clusters picked up in the step 1C (Step D).

In the above mentioned steps, the card controller 31 determines a free or fresh erase block(a) and a writable cluster(s) to which the data is to be written.

Thereafter, the card controller 31 reads out the data to be written, stored in the buffer RAM 33, and transfers the read-out data to the found-out free or fresh erase block(s) or writable cluster(s) for the purpose of the data writing (Step 1E), and the card controller 31 controls to write the read-out data to a designated area (Step 1F). At this time, when the data is to be written to both the erase block(s) and the writable cluster(s), which of the erase block(s) and the writable cluster(s) is firstly to be written, can be freely determined.

At each time data has been written into one cluster, the card controller 31 updates the value of the FAT entry which is included the management information table stored in the management information RAM 32 and which corresponds to the cluster to which the data has been written (Step 1G). If the updating of the value of the FAT entries corresponding to all the written data is completed, the operation ends (Step 1H).

Figure 9A:
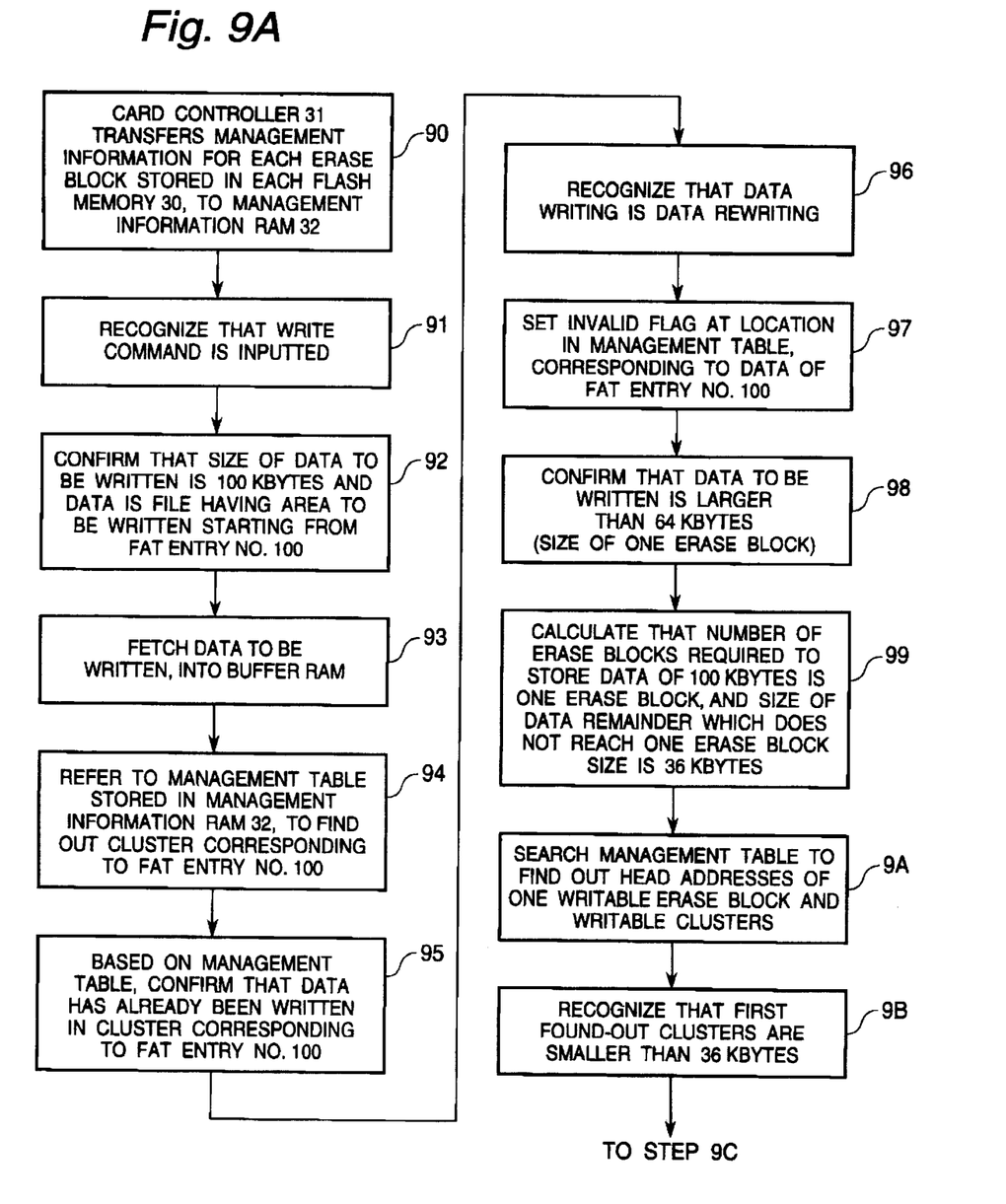
FIGS. 9A, 9B and 9C are flow charts illustrating a first specific embodiment of the data writing in the semiconductor disk in accordance with the present invention.

Next, one specific example of the data writing will be described with reference to FIGS. 9A, 9B and 9C, which are flow charts illustrating a first specific embodiment of the data writing in the semiconductor disk in accordance with the present invention.

In this example, it is assumed that each of flash memories 30 is divided into a plurality of erase blocks (as shown in FIG. 3) of 64 Kbytes and is so configured that erasure is performed in units of erase block of 64 Kbytes, and each erase block includes 16 clusters. It is also assumed that data of 100 Kbytes is to be written.

Now, a data writing operation of this specific example will be described with reference to FIGS. 9A and 9B.

After the power is turned on, under control of the card controller 31, the data storage management information concerning the erase blocks 40 of each flash memory 30 and the 16 clusters included in each erase block, is transferred to the management information RAM 32 (Step 90). However, if the management information RAM 32 is not provided in the semiconductor disk 20, the card controller 31 directly accesses to a management information storage area of the flash memory.

Thereafter, if a write command is issued, the card controller 31 recognize that the write command has been inputted (Step 91).

Then, the card controller 31 confirms that the size of the data to be written is 100 Kbytes and the data is data of a file starting from the FAT entry number 61 having No. 100 (Step 92). After these facts are recognized, the card controller 31 starts to fetch the data to be written, into the buffer RAM 33 (Step 93). At this time, this buffer RAM 33 may exists in the flash memory 30, differently from the example shown in FIG. 8.

During a period in which the data to be written is being fetched into the buffer RAM 33, the card controller 31 accesses to the management information RAM 32, to confirm the status of the cluster corresponding to the FAT entry No. 100 (Step 94).

In this example, since data has been already written in the cluster corresponding to the FAT entry No. 100, the card controller 31 confirms this fact (Step 95), and therefore, recognizes that the data writing is not a fresh or new writing (to an empty area), but a data rewriting (Step 96). Therefore, in order to allocate the rewrite data to a new block, the card controller 31 changes the value in the FAT entry No. 100 in the management information RAM 32, to a value indicative of invalidity (Step 97).

Furthermore, the card controller 31 confirms that the size of the data to be written is 100 Kbytes and is larger than the size of one erase block (64 Kbytes) (Step 98).

Succeedingly, the card controller 31 calculates that, in order to store the data of 100 Kbytes to be written, the data to be written is divided into one erase block (64 Kbytes) and data of 36 Kbytes which does not reach one erase block size (Step 99).

Based on the result of the above calculation, the card controller 31 accesses to the management information table stored in the management information RAM 32, to find out a head address of one writable (or empty) erase block and a head address of a group of writable (or empty) continuous clusters (Step 9A)

In this shown example, since the first found-out group of writable clusters are smaller than 36 Kbytes (Step 9B), the card controller 31 conducts retrieval again, to find out a next group of writable continuous clusters (Step 9C).

Finally, the card controller 31 picks up all groups of writable continuous clusters not smaller than 36 Kbytes (Step 9D), and further, selects one group of writable continuous clusters closest (most preferably, equal) to 36 Kbytes, among all the picked-up groups of writable continuous clusters (Step 9E).

Thus, the card controller 31 determines that this selected group of writable continuous clusters and the one writable erase block found out as mentioned above are allocated for storing the data to be written, and then, reads out the data to be written, fetched in the buffer RAM (Step 9F), and writes the read-out data to the one found-out writable erase block and the selected group of writable continuous clusters (Step 9G). In this writing process, at each time the writing of the data of the amount corresponding to one cluster is completed, the card controller 31 updates the value of the FAT entry in the management information RAM 32, corresponding to the cluster to which data has been written (Step 9H).

Thus, when all the data of 100 Kbytes is written and the value of the FAT entry corresponding to a final cluster of the file has been updated, this writing operation is completed (Step 9I).

The above is the data writing operation.

Next, an operation for re-allocating the data which has been already written, will be described with reference to FIGS. 9B and 9C.

If the operation of the step 91 to the step 9I is repeated, the status of the blocks and the clusters in each flash memory assumes one of the following three conditions:

(1) first condition in which no data is stored and therefore is writable;

(2) second condition in which a valid data is stored; and (3) third condition in which data is stored but the value indicative of invalidity is set in the corresponding FAT entry, because the same data has been rewritten to another block or cluster (in other words, an invalid data is stored)

Accordingly, if the operation of the step 91 to the step 9I is performed further repeatedly, the invalid data increases more and more, and finally, it becomes no writable area.

In order to avoid this situation, it is necessary to suitably execute the re-allocation of the data stored in the flash memories 30.

Figure 9B:
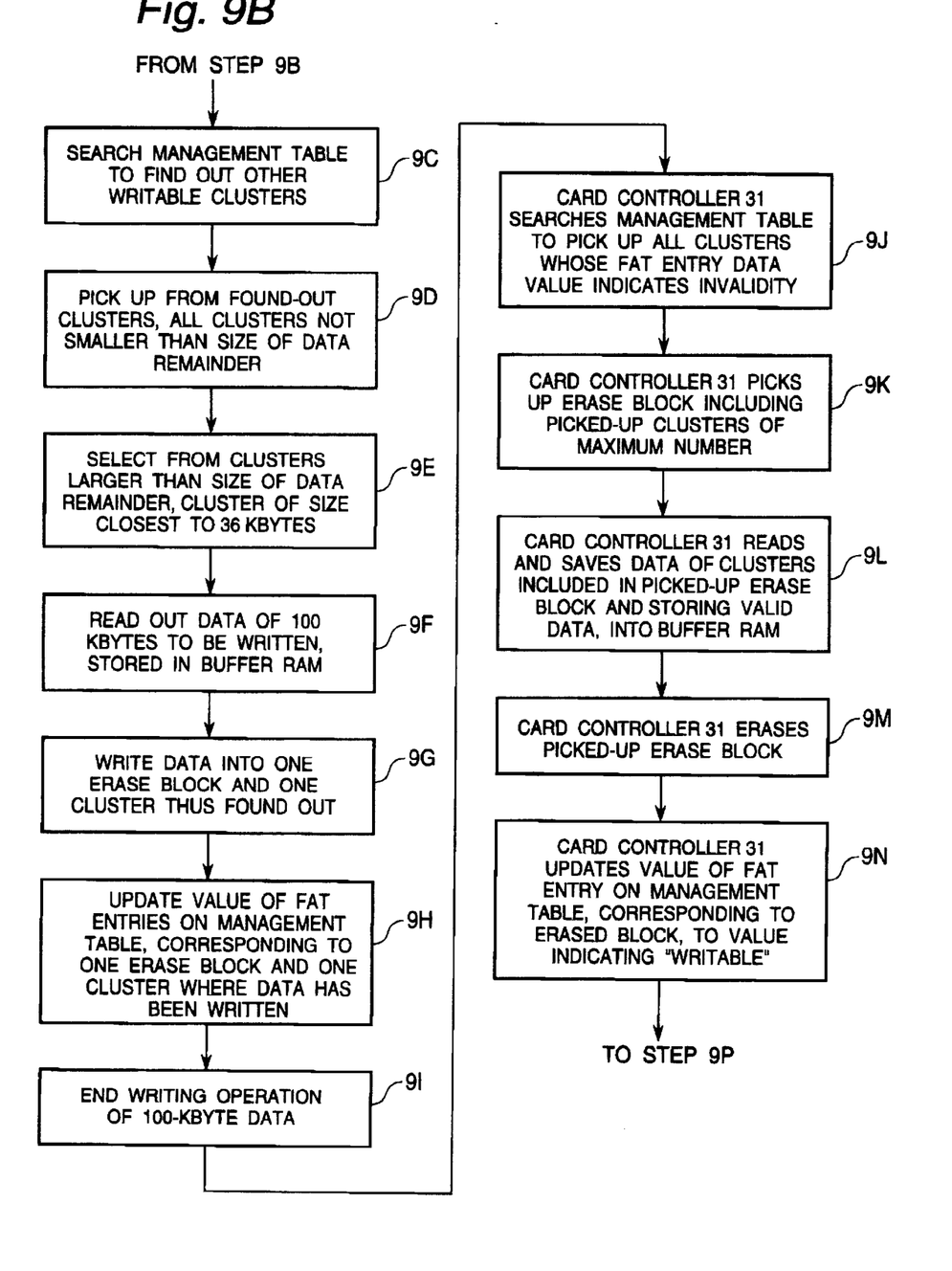
Figure 9C:
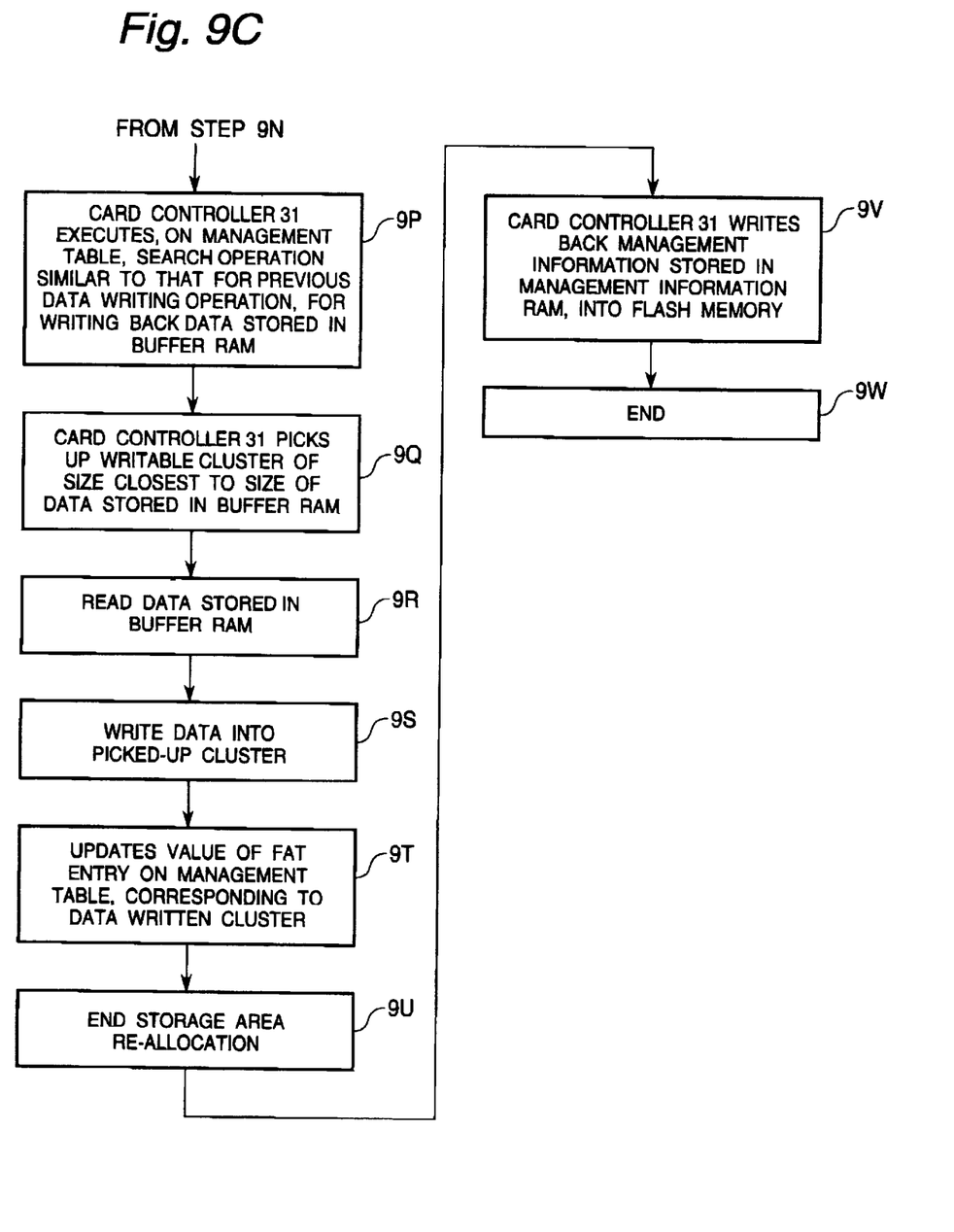

Steps 9J to 9U in FIGS. 9B and 9C are a flow chart illustrating this re-allocation operation.

The card controller 31 searches the management table stored in the management information RAM 32, to pick up all clusters whose FAT entry value indicates invalidity (Step 9J), and also picks up the erase block(s) including a large number of picked-up clusters having the FAT entry value indicative of invalidity (Step 9K). Here, in this pick-up process of the erase blocks, attention may be paid not only to the number of invalid data clusters bus also to the number of erasings of the block.

Succeedingly, the card controller 31 reads and saves data of clusters included in the picked-up erase block and storing valid data, into the buffer RAM 33 (saving of valid data) (Step 9L). Thereafter, the card controller 31 erases the picked-up erase block (Step 9M).

Then, the card controller 31 updates the value of the FAT entries on the management table, corresponding to the erased block, to a value indicative of "writable". Thus, the number of writable blocks is increased.

Thereafter, in order to write back the data which is stored in the buffer RAM 33 (and which was stored in the valid clusters within the erase block which has now been erased into a writable condition), the card controller 31 executes an operation similar to the above mentioned operation of the Steps 9A to 9E. Namely, the card controller 31 searches the management table, to find out writable clusters (Step 9P), and picks up a group of writable clusters of size closest (most preferably equal) to the size of the data stored in the buffer RAM 33 (Step 9Q). Then, the card controller 31 reads out the data stored in the buffer RAM 33 (Step 9R), similarly to the step 9F, and writes the data into the clusters picked up, namely, re-allocated in the step 9Q (Step 9S).

Similarly to the step 9H, the card controller 31 updates the value of FAT entry on the management table stored in the management information RAM 33, corresponding to a data written cluster at each time the data is written into one of the re-allocated clusters (Step 9T). When the values of the FAT entries corresponding to the clusters which have stored all the valid data stored in the buffer RAM 33 have been updated, the data re-allocation operation is completed (Step 9U).

The above is the data re-allocation operation, and is executed at an arbitrary timing during a period in which the power is on.

Furthermore, the management information stored in the management information RAM 32 is written back to the flash memory 30 (Step 9V), so that the current data storage status is reflected in the flash memory. Thus, the operation is ended (Step 9W).

This operation is preferably conducted collectively in an arbitrary period after the power is turned on and before the power is turned off. In the case that no management information RAM 32 is provided in the semiconductor disk, this operation is conducted in a management information storing area of the flash memory.

By the above mentioned operation, the data to be written is allocated to a storage area of the size corresponding to the size of the data to be written.

Figure 10A:
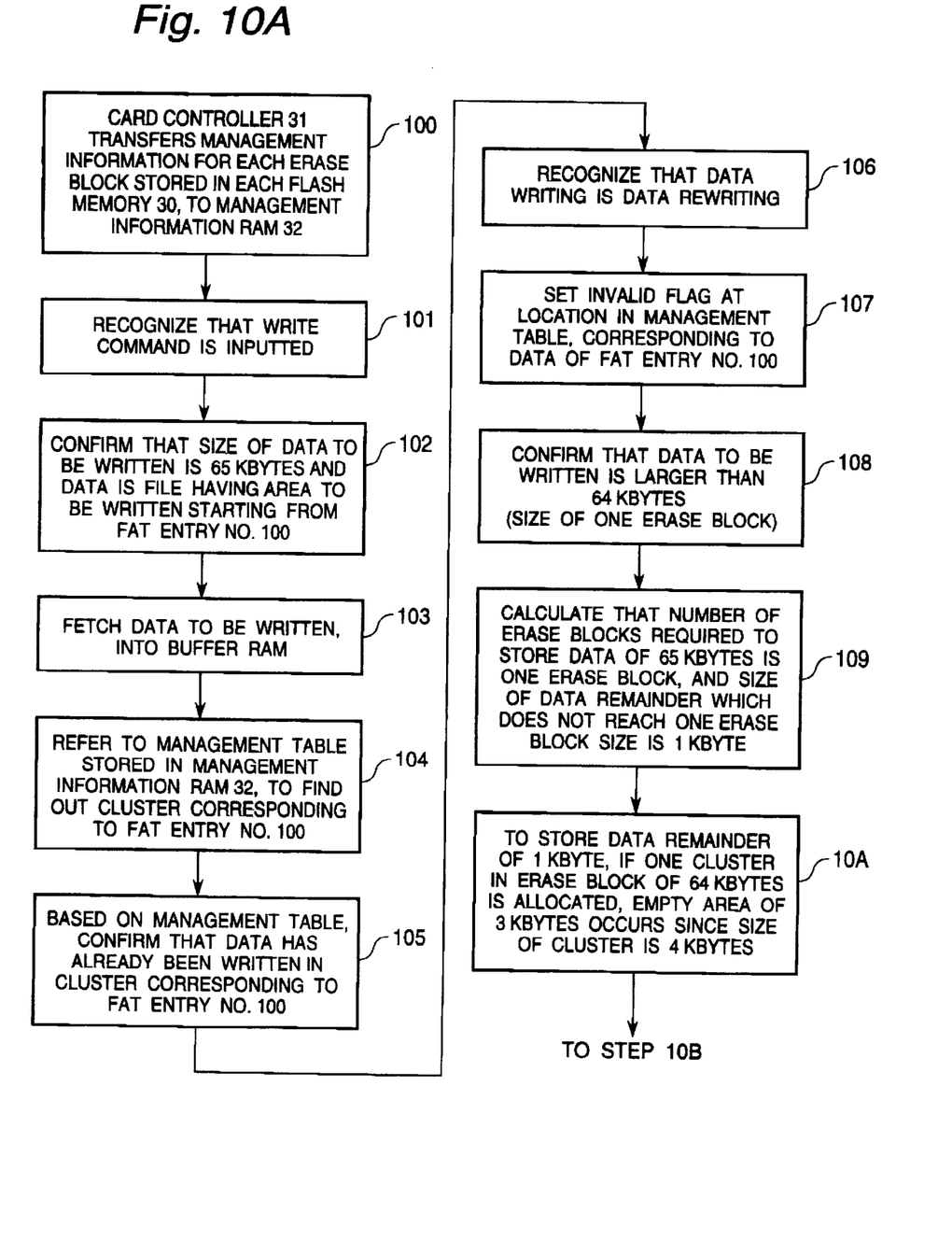
FIGS. 10A and 10B are flow charts illustrating a second specific embodiment of the data writing in the semiconductor disk in accordance with the present invention.
Figure 10B:
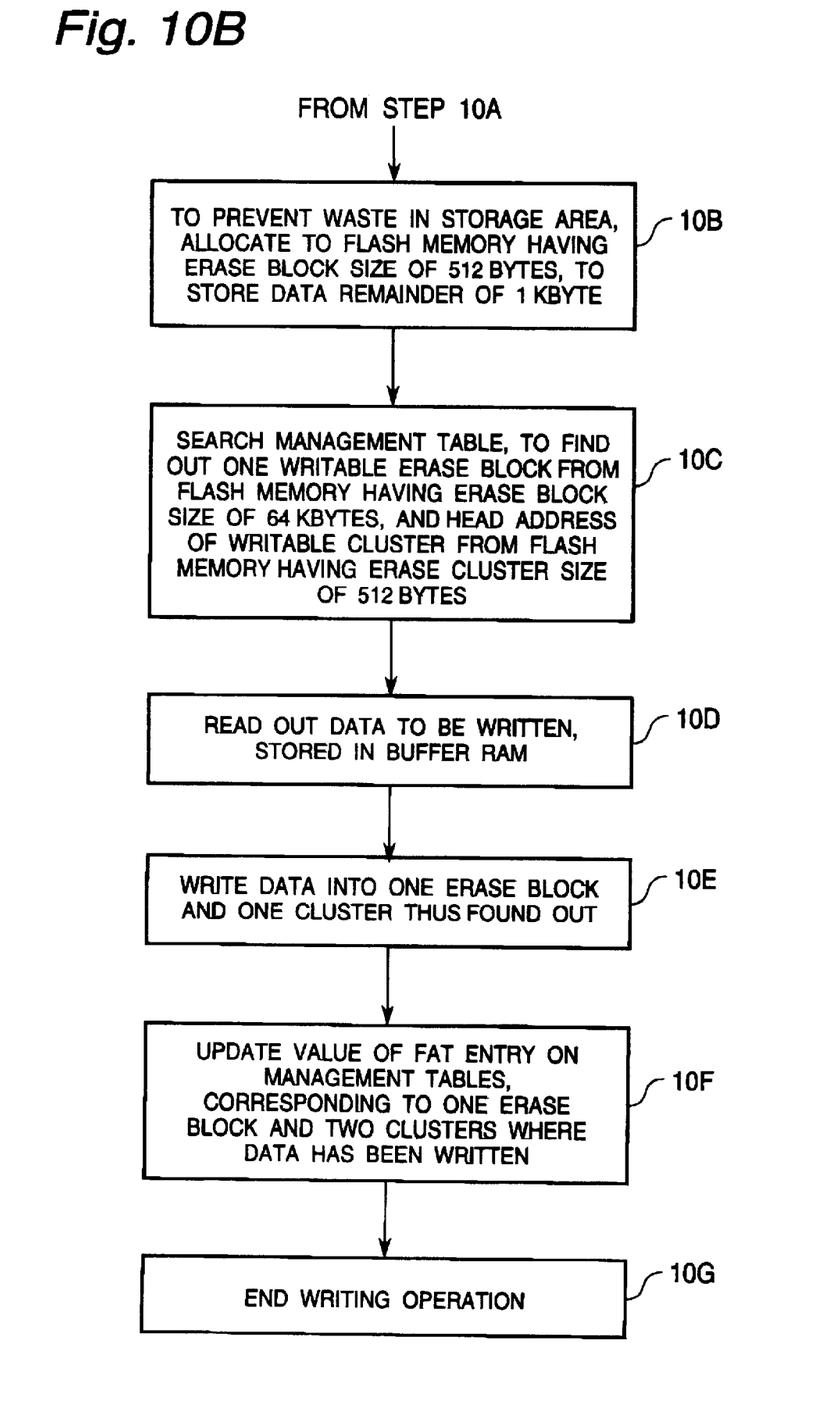

Now, a second specific embodiment of the data writing in the semiconductor disk in accordance with the present invention, will be described with reference to a flow chart of FIGS. 10A and 10B. This second specific embodiment is greatly different from the first specific embodiment in an erase block dividing fashion. In the second specific embodiment, the semiconductor disk 20 includes at least one flash memory 30 composed of erase blocks of 64 Kbytes and at least one flash memory 30 composed of erase blocks of 512 bytes.

After the power is turned on, under control of the card controller 31, the data storage management information concerning the erase blocks of the flash memory having 64-Kbyte erase blocks and the 16 clusters included in each erase block, and the data storage management information concerning the erase blocks of the flash memory having 512-byte erase blocks or clusters, are transferred to the management information RAM 32 (Step 100).

Thereafter, if a write command is issued, the card controller 31 recognize that the write command has been inputted (Step 101). Then, the card controller 31 confirms that the size of the data to be written is 65 Kbytes and the data is data of a file starting from the FAT entry number 61 having No. 100 (Step 102). After these facts are recognized, the card controller 31 starts to fetch the data to be written, into the buffer RAM 33 (Step 103).

During a period in which the data to be written is being fetched into the buffer RAM 33, the card controller 31 accesses to the management information RAM 32, to confirm the status of the cluster corresponding to the FAT entry No. 100 (Step 104). In this example, since data has been already written in the cluster corresponding to the FAT entry No. 100, the card controller 31 confirms this fact (Step 105), and therefore, recognizes that the data writing is not a fresh or new writing (to an empty area), but a data rewriting (Step 106).

Therefore, in order to allocate the rewrite data to a new block, the card controller 31 changes the value in the FAT entry No. 100 in the management information RAM 32, to a value indicative of invalidity (Step 107). Furthermore, the card controller 31 confirms that the size of the data to be written is 65 Kbytes and is larger than the size of one erase block (64 Kbytes) (Step 108).

Succeedingly, the card controller 31 calculates that, in order to store the data of 65 Kbytes to be written, the data to be written is divided into one erase block (64 Kbytes) and data of 1 Kbyte which does not reach one erase block size (Step 109).

Here, it is recognized that, if one cluster in the 64-Kbyte erase block is allocated to store data remainder of 1 Kbyte, since the data of 1 Kbyte is stored in the cluster of 4 Kbytes, empty storage area of 3 Kbytes occurs (Step 10A). To store the data remainder of 1 Kbyte, it is judged that it is more efficient to allocate two 512-byte erase blocks in the flash memory composed of 512-byte erase blocks (Step 10B).

Therefore, the card controller 31 accesses the management table in the management information RAM 32, to find out a head address of one writable erase block from the flash memory composed of 64-Kbyte erase blocks, and a head address of two writable blocks (or clusters) from the flash memory composed of 512-byte erase blocks (or clusters) (Step 10C).

As a result, the card controller 31 determines that the data to be written is allocated to one 64-Kbyte erase block and two 512-byte erase blocks (or clusters), and reads out the data to be written, stored in the buffer RAM 33 (Step 10D) and writes the data into the thus allocated erase blocks (one 64-Kbyte erase block and two 512-byte erase blocks (or clusters)) (Step 10E).

At each time the writing of the data of the amount corresponding to one cluster is completed, the card controller 31 updates the value of the FAT entry in the management information RAM 32, corresponding to the cluster to which data has been written (Step 10F).

Thus, when all the data of 65 Kbytes is written and the value of the FAT entry corresponding to a final cluster of the file has been updated, this writing operation is completed (Step 10H).

As seen from the above, the second specific embodiment not only can allocate the data to be written, to a storage area of the size corresponding to the size of the data to be written, but also can apply this optimum allocation to the semiconductor disk including different flash memories having different erase block sizes.

Thus, the non-volatile semiconductor storage in accordance with the present invention can reduce the number of rewritings in each erase block, thereby to elevate reliability of the non-volatile semiconductor storage having a lifetime in the number of rewritings of erase block. This is because the non-volatile semiconductor storage in accordance with the present invention compares the size of the data to be written, with the size of one erase block in the non-volatile semiconductor storage and the size of an empty storage unit in a writable erase block, and makes allocation to minimize the number of erase blocks required to store the data to be written, namely, the waste storage area occurring when the data to be written is stored.

The invention has thus been shown and described with reference to the specific embodiments. However, it should be noted that the present invention is in no way limited to the details of the illustrated structures but changes and modifications may be made within the scope of the appended claims.

What is claimed is:

1. A non-volatile semiconductor storage comprising:
   at least one internal electrically programmable and erasable memory comprised of storage blocks which can be written and erased independently of each other, each of said storage blocks including one or more storage units;
   temporary memory means for temporarily storing data to be written into said storage units and data read out from said storage units;
   an information storage area indicating the status of data stored in each of said storage units;
   control means for controlling a reading and writing of information in said information storage area;

said control means comprising:
- means for recognizing a writing command when said writing command is supplied from an external device external to the non-volatile semiconductor storage;
- means for fetching into said temporary memory means, data to be written, supplied from said external device;
- means for calculating the size of said data to be written;
- means for comparing the size of said data to be written, with the size of said blocks and the size of said storage units, and calculating the required number of said blocks and said storage units, required for storing said data;
- means for searching said information in said information storage area, to find available empty writable blocks and groups of writable storage units;
- means for allocating, of said data to be written, data of the size corresponding to a natural number times the size of said block, to said found empty writable blocks, said means comparing a data remainder obtained by subtracting said natural number times the size of said block from said data to be written, with the size of said groups of found storage units, and allocating said data remainder to one of said groups of found storage units, said one group of found storage units being, of said groups of found storage units, closest in size to said data remainder and being equal to or larger in size to said data remainder;
- means for reading, after the above mentioned allocation is completed, said data to be written stored in said temporary memory means, to write said data to be written to said allocated blocks and storage units; and
- means for updating the information in said information storage area, corresponding to said allocated blocks and storage units to which said data to be written has been written.

2. The non-volatile semiconductor storage claimed in claim 1 wherein when said data remainder is compared with the size of said groups of found storage units, and when the size of said groups of found storage units is smaller than the size of said data remainder, said allocating means further searches to find further groups of writable empty storage units.

3. The non-volatile semiconductor storage claimed in claim 1 wherein each of said blocks and said storage units has an arbitrary size.

4. The non-volatile semiconductor storage claimed in claim 1 further comprising an additional writable and readable memory means for receiving and storing the information in said information storage area, under control of said control means, so that when said non-volatile semiconductor storage is in a powered-on condition, said control means accesses said additional writable and readable memory means in place of said information storage area, and at an arbitrary time, writes back information stored in said additional writable and readable memory means to said information storage area.

5. A non-volatile semiconductor storage claimed in claim 1 wherein said temporary memory means is provided in said at least one internal electrically programmable and erasable memory.

6. The non-volatile semiconductor storage claimed in claim 1 wherein, at any time other than the data writing time, said control means searches to find other writable empty blocks and storage units within said at least one internal electrically programmable and erasable memory, and re-allocates data which has been written in said at least one internal electrically programmable and erasable memory to said found other writable empty blocks and storage units.

* * * * *